Patented Sept. 25, 1951

2,569,288

UNITED STATES PATENT OFFICE 2,569,288

PREPARATION OF N-BENZYL-BETA-HALOPROPIONAMIDES

Robert T. Cassell, Kew Gardens, and Samuel Kushner, Nanuet, N. Y., assignors to American Cyanamid Company, New York, N. Y., a corporation of Maine No Drawing. Application September 24, 1949, Serial No. 117,738

4 Claims. (Cl. 260—562)

This invention relates to physiologically active compounds and more particularly to a process for preparing an anticonvulsant of superior qualities.

It has been discovered that N-benzyl-beta-chloropropionamide possesses excellent anticonvulsant properties and is relatively non-toxic. This discovery is considered surprising in view of the fact that compounds having closely related structures are either inactive or too toxic to be of value in epileptic therapy.

N-benzyl - beta - chloropropionamide in pure form consists of colorless crystals melting in the range 92–93° C. It is slightly soluble in water and moderately soluble in the lower alcohols. It decomposes in hot aqueous acid solution and hot aqueous alkaline solution.

Since the beta chlorine atom is extremely reactive, the reaction should be conducted within carefully defined limits and conditions, or a molecule of hydrochloric acid splits out and acrylic acid derivatives are formed instead of the desired product. The acrylic acid derivatives, primarily acrylic acid benzylamide, do not have any therapeutic properties and, moreover, possess a very penetrating and disgusting odor. It is apparent therefore, that a method of preparation of the drug is necessary which will not lead to any contamination with the undesired by-products since as little as one part of the contaminant per thousand parts drug will render the preparation unpalatable for oral administration.

A method has been found for the preparation of N-benzyl-beta-propionamide which yields a product completely uncontaminated by acrylic acid benzylamide. The method of this invention consists of reacting benzylamine with beta-chloropropionyl halide in the presence of an amount of alkali equivalent to the halogen acid released in the course of the reaction. The reaction is exothermic in nature, takes place readily, and is completed within a very short time. In view of the nature of the reactants, the preferred solvent for the reaction product is water. It has been found that other solvents, especially organic solvents, promote the tendency to olefination of the aliphatic chain. This tendency increases as the nature of the solvent varies from alcohol which is similar to water in its polarization potential to the more complex solvents such as pyridine, quinoline and dioxane. When the reaction is attempted in alcohol, small amounts of acrylic acid benzylamide can be detected by their odor. In the other more complex solvents, the tendency of the reaction is toward more complete dehydration and the reaction products consist mainly of the acrylic acid derivatives.

Since the reaction is exothermic and is extremely prone to continue in the direction of unsaturation of the aliphatic side chain, it is necessary to conduct the reaction in the temperature within the range −15° to 50° C. At temperatures below this, the reactants are solids and the reaction rate is completely uneconomic whereas at temperatures above those stated, there is a pronounced tendency for the formation of the acrylic acid benzylamide as evidenced by simple olfactory tests.

In the preferred method of preparation of the useful anti-epileptic drug, it has been found most effective to add the beta-chloropropionyl chloride to a solution of benzylamine in water with concurrent addition of just enough alkali metal hydroxide dissolved in water to neutralize the halogen acid formed during the course of the reaction. In this manner, the pH of the solution in which the product is formed is continually in the range of pH 4–9 and there is never sufficient alkalinity present to encourage the reactions which would lead to the unsaturated derivatives.

The reaction will now be illustrated by a specific example describing the preferred method in detail.

EXAMPLE

*N-benzyl-beta-chloropropionamide*

A 100 gallon lined jacketed kettle provided with cooling is charged with 100 lb. of benzylamine and 150 liters of water. The mixture is cooled to 5° C. and with stirring 119 lbs. of beta-chloropropionyl chloride and a solution of 45 lbs. of sodium hydroxide pellets in 40 liters of water are added simultaneously at such a rate that the temperature does not exceed 10° C. During this period the pH of the mixture should be on the alkaline side but below pH 9.5. When the addition is complete the pH should be about 8. The mixture is stirred overnight in the cold, and the solid product is filtered. The filter cake is reslurried with about 80 gallons of water, filtered, and air-dried. Yield, 128 lbs. The crude material is recrystallized by dissolving it in the minimal quantity of hot methanol (about 50 gallons), adding Norite, and filtering hot. Upon cooling slowly (finally to about 5° C.) large crystals separate; they are filtered and air-dried. Yield, 109 lbs. Melting point 92–93° C.

We claim:

1. The method of preparing N-benzyl-betachloropropionamide which comprises mixing together benzylamine and beta-chloropropionyl chloride in water at a temperature within the range —15° C. to 50° C. while maintaining the hydrogen ion concentration within the range pH 4 to pH 9.

2. The method of preparing N-benzyl-beta-chloropropionamide which comprises adding beta-chloropropionyl chloride and an aqueous alkaline solution to an aqueous solution of benzylamine maintained at a temperature in the range —15° to 50° C. while maintaining the hydrogen ion concentration of the solution within the range pH 4 to pH 9.

3. In the process of preparing N-benzyl-beta-chloropropionamide, the step which comprises simultaneously adding equivalent amounts of beta-chloropropionyl chloride and aqueous alkaline solutions to an aqueous solution of benzylamine while maintaining the temperature with the range —15° to 50° C. and the hydrogen ion concentration within the range pH 4 to pH 9.

4. In the process of preparing N-benzyl-beta-chloropropionamide, the step which comprises simultaneously adding equivalent amounts of beta-chloropropionyl chloride and aqueous alkaline solutions to an aqueous solution of benzylamine and maintaining the reaction mixture at a temperature below 20° C. and the hydrogen ion concentration within the range pH 4 to pH 9.

ROBT T. CASSELL.
SAMUEL KUSHNER.

REFERENCES CITED

The following references are of record in the file of this patent:

UNITED STATES PATENTS

| Number | Name | Date |
|---|---|---|
| 2,139,190 | Iselin et al. | Dec. 6, 1938 |
| 2,288,197 | Kranjlein et al. | June 30, 1942 |
| 2,336,179 | Leuchs et al. | Dec. 7, 1943 |

OTHER REFERENCES

Hamilton: "J. Am. Chem. Soc.," vol. 51 (1929), pp. 3158–3161.

Child et al.: "J. Chem. Soc." (London), 1931, pp. 36 to 49.

"Chemical Abstracts," vol. 36 (1942), p. 1603 (Abstract of Pajagopalon—"Proc. Indian Acad. Sci.," vol. 14a (1941), pp. 126 to 132.